Sept. 2, 1958 W. F. BANKAUF 2,850,149
PASSENGER CONVEYOR
Filed Nov. 17, 1955 3 Sheets-Sheet 1
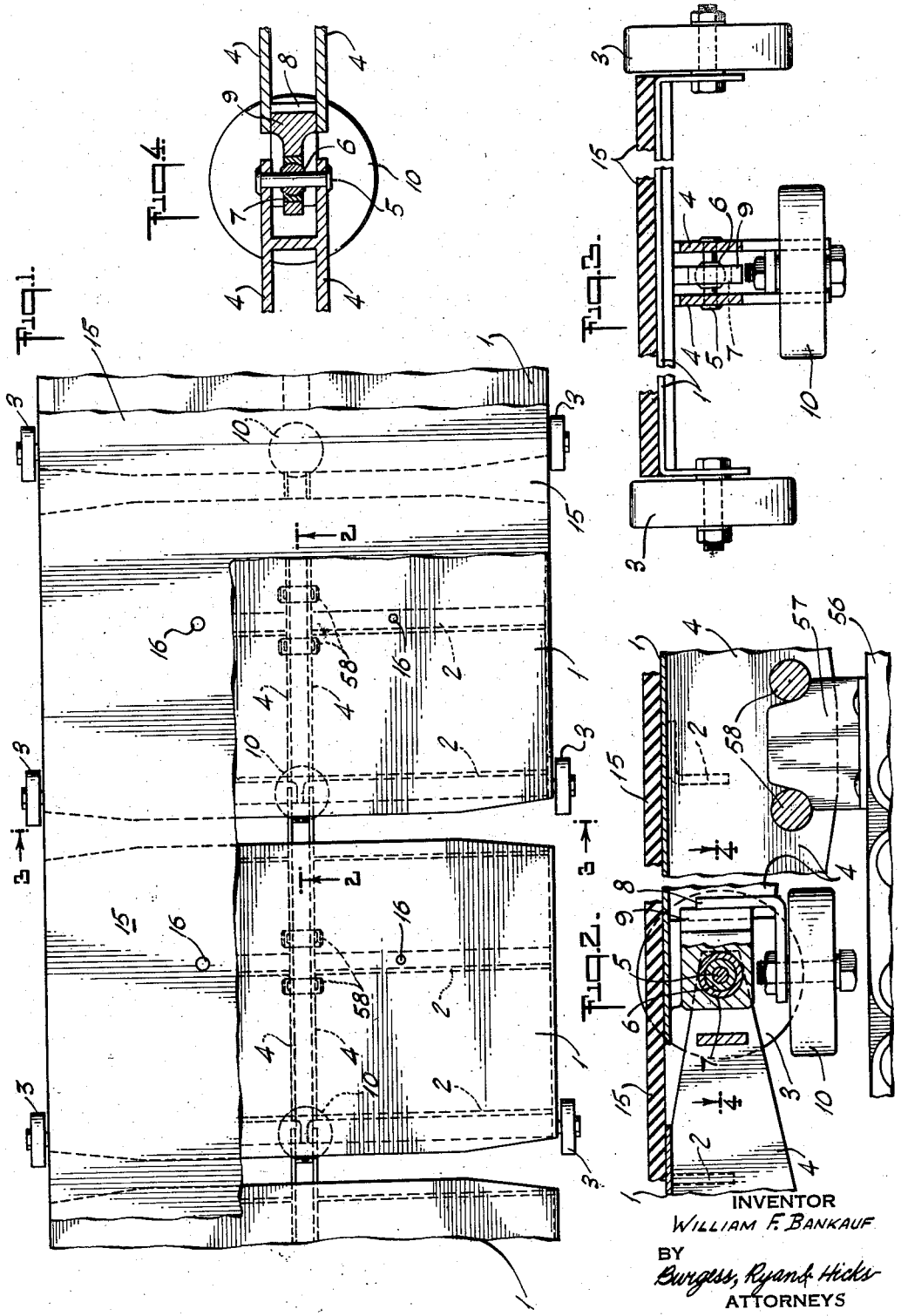
INVENTOR
WILLIAM F. BANKAUF
BY
Burgess, Ryan & Hicks
ATTORNEYS

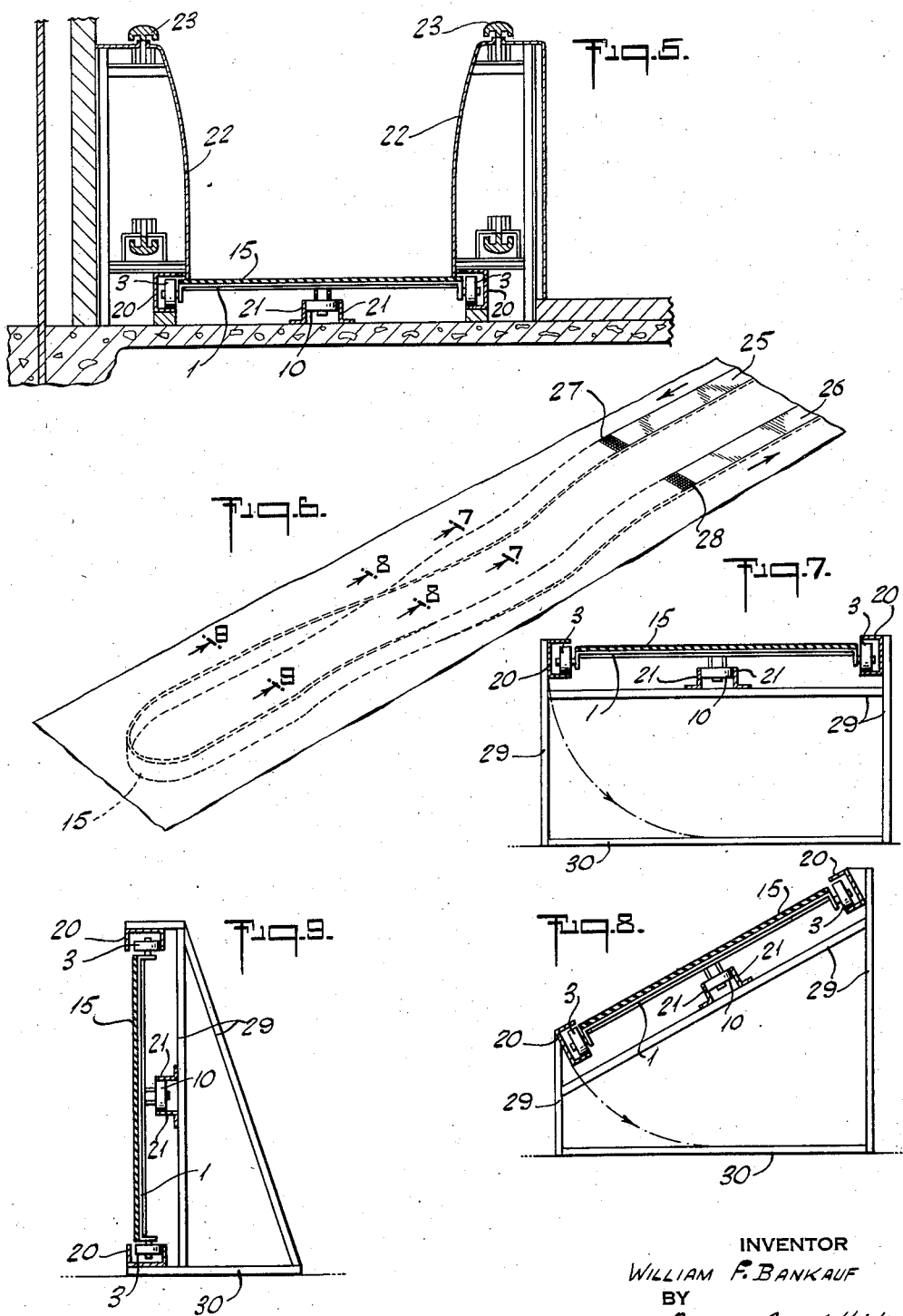

Sept. 2, 1958   W. F. BANKAUF   2,850,149
PASSENGER CONVEYOR
Filed Nov. 17, 1955   3 Sheets-Sheet 3
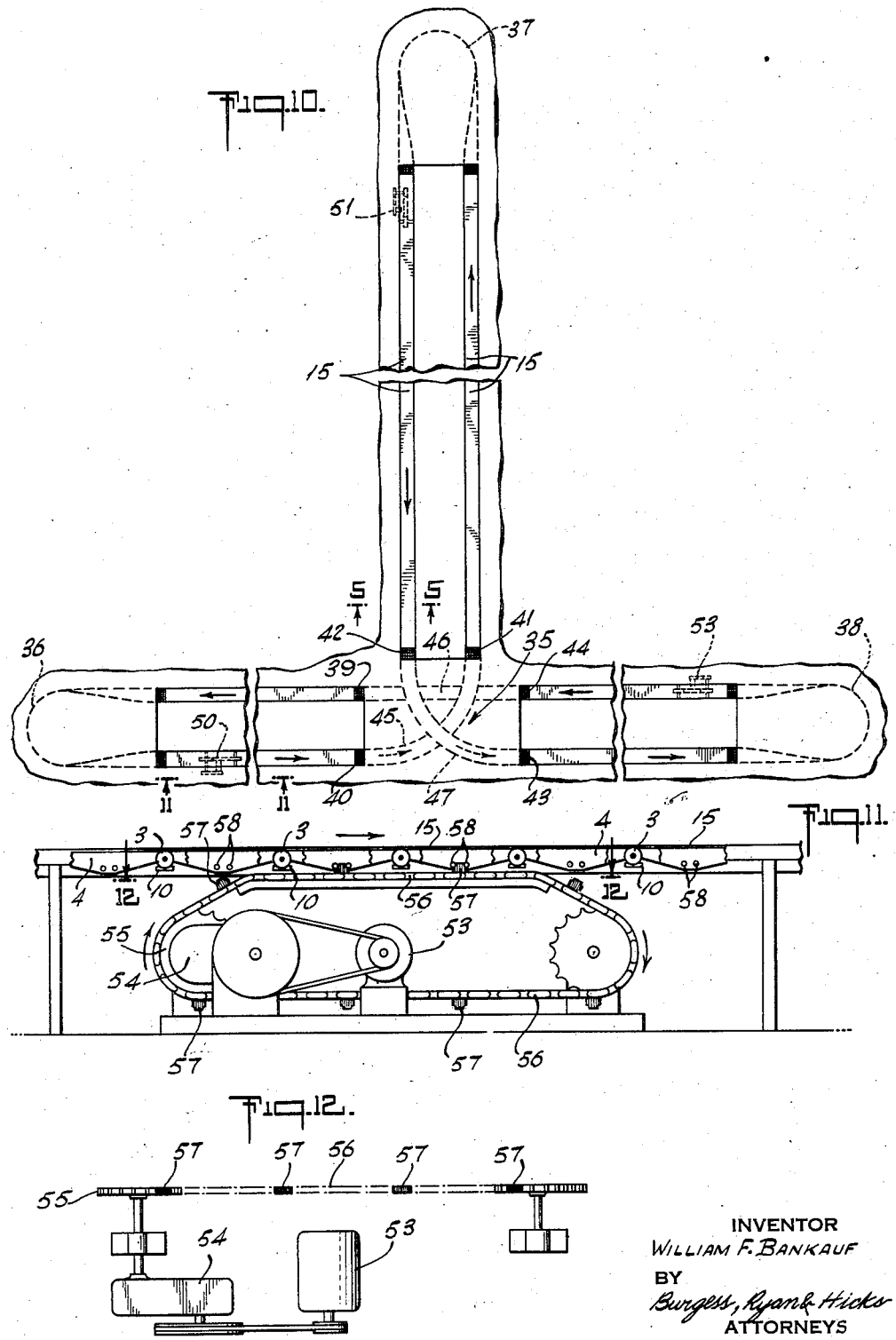
INVENTOR
WILLIAM F. BANKAUF
BY
Burgess, Ryan & Hicks
ATTORNEYS

United States Patent Office 2,850,149
Patented Sept. 2, 1958

2,850,149

PASSENGER CONVEYOR

William F. Bankauf, East Paterson, N. J., assignor to Hewitt-Robins Incorporated, Stamford, Conn., a corporation of New York Application November 17, 1955, Serial No. 547,348

10 Claims. (Cl. 198—181)

This invention relates to apparatus for transporting passengers for relatively short distances by means of a platform continuously moving at a speed such that passengers can step on and off at loading and discharge points without difficulty.

The main object of the invention is to provide an apparatus of this general type in which the standing surface for the passengers is continuous or unbroken and arranged to travel with a smooth motion devoid of such vertical jarring or vibration as is experienced if such surface, in the form of a belt, for example, is drawn over a series of supporting rollers.

A further object of the invention is to provide an apparatus of the said general type which is so constructed that the standing surface can be caused to travel smoothly over a course including grades, as well as horizontal stretches, and even around horizontal curves, if desired, without any buckling of the surface.

As will later be apparent, the conveyor of this invention makes possible the use of the same standing surface for a complete circuit, that is, both outgoing and return. It is adaptable also to situations requiring that a minimum amount of space be taken up by the conveyor in a return bend by resort to what will be referred to herein as a roll over turn.

The invention accomplishes these results by making use of an endless, elastic belt which, however, is non-working; that is to say, its function is simply to provide the desired comfortable standing surface and not, as in an ordinary conveyor, to be tensioned by a drive pulley. The belt is supported on and with its passenger load is transported by an endless train of wheeled platform members to which the drive is applied, all as described below in detail.

As already indicated, the conveyor of this invention lends itself to travel horizontally, up grade, down grade, through flat or horizontal turns and through roll over turns. The installation shown in the drawings incorporates all of these features or arrangements although it will be understood that this is for the purpose of illustration only and that the needs of any particular installation will dictate the extent to which these various arrangements are combined.

In the drawings:

Fig. 1 is a broken-out top plan view of a part of the train or series of wheeled platform members of an installation embodying the preferred form of construction;

Fig. 2 is a vertical section on the line 2—2 of Fig. 1;

Fig. 3 is a broken-out vertical section on the line 3—3 of Fig. 1;

Fig. 4 is a horizontal section on the line 4—4 of Fig. 2;

Fig. 5 is an enlarged vertical section on the line 5—5 of Fig. 10;

Fig. 6 is a perspective diagram of a roll over turn;

Figs. 7, 8 and 9 are diagrammatic vertical sections as on the lines 7—7, 8—8 and 9—9 of Fig. 6;

Fig. 10 is a diagrammatic plan of one form of installation;

Fig. 11 is a vertical elevation, partly diagrammatic, of the portion of the installation as viewed on the line 11—11 of Fig. 10; and Fig. 12 is a diagrammatic horizontal section, as on the line 12—12 of Fig. 11.

Referring first to Figs. 1-4, it will be seen that the body of each platform member comprises a flat, more or less rectangular plate 1, stiffened by angles 2 secured to its underside. Each platform member is wheel supported at one end and supported at its other end by a swivel connection with the wheeled end of the adjacent platform member. In the preferred form and for reasons which will appear, the swivel connection is actually a universal joint. For the purpose of more conveniently locating and identifying the various parts, the right hand end of each platform member as viewed in Fig. 1 will be termed the leading end and the left hand end the trailing end.

As shown, the trailing end of each platform member is provided with a pair of wheels 3 mounted on stub shafts on a common axis. Secured to the underside of each platform 1 and running lengthwise and centrally of it are two spaced bars 4 which project beyond the leading end of each platform and beneath the trailing end of the next platform. These bars 4 constitute a rigid drawing bar carrying at the leading end (Fig. 4) a cross pin 5 on which is mounted a ball 6 seated in socket 7 carried by the adjacent end of the draw bar of the next platform. It will be noted that the horizontal axis of the ball and socket coincides with the axis of wheels 3. A complete conveyor of this preferred form includes an endless train or series of identical platform members constructed as described; and it will be recognized that while securely coupled against relative endwise movement, the platform members are movable relative to one another in a horizontal plane, as when making a flat turn, and are also relatively movable when following an undulating or even a helical path. To permit such movements without interference, the members are slightly spaced apart and their corners trimmed off as indicated (Fig. 1) or as may be necessary in any particular installation.

In addition to the foregoing, each platform is provided with what will be referred to as vertical axis wheel means, to distinguish such means from what will be termed the horizontal axis wheels 3. These designations are for convenience only because in use, as will appear, the wheels and wheel means may assume various positions other than horizontal and vertical. As shown particularly in Figs. 2 and 4, an angle 8 depending from spacer block 9 supports the stub shaft of wheel 10, which is the vertical axis wheel means, its axis intersecting the common axis of wheels 3.

According to this invention the entire top surfaces of all of the platform members and the spaces between them are covered by an elastic belt of rubber or the like, which constitutes an unbroken surface on which the passengers stand and are conveyed. This is a non-working belt, in the sense that it is not subjected to the conveyor drive tension, its primary function being simply to furnish a smooth, comfortable surface on which the load is transported. Accordingly, it need not and in order to provide all of the advantages of the invention, should not be of the ordinary reinforced type such as is used in standard belt conveyors. The reasons for using an elastic belt are brought out later.

The belt is marked 15 and, as shown in Fig. 1, it is secured to each of the platform members, as by rivets 16 which are spaced apart widthwise and also spaced from the ends of the platform members. Thus, while the belt cannot leave these members, it is free to stretch and work independently of them. By using a belt of a relaxed length less than that of the train of platform members, that is, securing the belt to such members so that it is under some degree of tension, better support is afforded any load that happens to be applied at a point over the spaces between the platform members. Also, of course, the pretension reduces the draw bar pull at the couplings. For these purposes the belt may be stretched to about, say, 105% of its relaxed length.

In some installations a considerably greater degree of pretensioning of the belt is required, it having been found that, provided the initial tension is adequate, the conveyor can be guided around flat (horizontal) curves of surprisingly small radius without any buckling of the belt. What happens in such an arrangement is that the belt on the inner side of the curve contracts, but not beyond its relaxed length, and the belt on the outer side of the curve is tensioned still more.

For example, a neoprene belt 36" wide, pretensioned to the extent of 10.3%, will readily make a horizontal turn of a radius, on its center line, of 23' 6". In making such a turn, its outer edge tension or extension will increase to 16.3% and its inner edge decrease to 2.8%. It is desirable to maintain some degree of stretch on the inner edge because any such stretched belt will take a permanent set; that is, after being held under tension for any extended period and then relaxed, it will not return fully to its original length. Belt compounds appropriate for the purpose may have a permanent set of between 1% and 2%, meaning that their relaxed length after stretching will be from 1% to 2% greater than their original length. Hence, it is preferred to establish a belt tension such that its minimum at any time (as on the inner edge of a horizontal turn) is somewhat in excess of say, 2.5%. With the particular belt under consideration, the initial stretch of 10.3% represents an actual tension of approximately 22 lbs. per inch of belt width.

A similar belt of 42" width can negotiate a horizontal turn of a radius of 25' (measured on its center line). Its initial stretch of 10.3% will increase to 18.5% on the outer edge and decrease to about 3% on its inner edge.

These figures will serve to illustrate the degree of elasticity required in the indicated types of installation and are to be contrasted with that of the standard type of conveyor belt which, when under full load tension, has a stretch of the order of only 1% or 1½%.

The course of the conveyor is established and maintained by suitable tracks and, due to the flexibility of the train as above described, such course can be varied widely to suit the needs of a great many types of installation. As illustrated particularly in Fig. 5, the horizontal axis wheels 3 are located in channel member tracks 20 and the vertical axis wheels between angle track members 21.

This diagrammatic view also illustrates a typical installation in which the sides of the conveyor are fenced, as at 22, and the provision of a conventional moving hand rail 23. Since the details of these latter components form no part of the present invention they will not be described.

The use of channel form tracks for the horizontal axis wheels, or at least tracks which incorporate an upper as well as a lower rail or guide, is indicated particularly where the platform members are of the preferred type illustrated, that is, wheeled at one end only. With that type of platform member, a sufficient load concentrated on one only of the corners of the member at its leading end might cause such member to tip, raising the wheel at the diagonally opposite trailing corner. Any such tipping is prevented by the upper guide or rail.

As regards the track for the vertical axis wheels, it will be recognized that a guide or rail on one side only is all that is required during a turn, whether horizontal or of the roll over type. However, the double guide is preferred to insure accurate tracking of the conveyor in the straight stretches; that is, to prevent any lateral wandering of the platform members on their horizontal axis wheels.

Figs. 6 to 9 illustrate a roll over turn. In such an installation the passenger conveying stretches of the conveyor are indicated at 25 and 26, the terminal points being marked 27, 28, respectively. These are the points at which the passengers are required to leave and at which they may step on to the belt surface. At or shortly beyond these points, the tracks and conveyor may dip down, as illustrated, and a turn on a very short radius made either underground or in an enclosure as convenience may dictate. To make the illustrated roll over turn, the tracks are diverted in a helical path (see Figs. 7 and 8) preferably until the platform surface of the conveyor is vertical (see Fig. 9). After emerging from the 180° turn the tracks are diverted back again until the platform surface resumes its normal horizontal position. During the turn, of course, the vertical axis wheel means and their tracks afford support to the conveyor. It will be noted that the belt is located on the outside of the turn so that it is sustained by the platform members throughout and so that its tension engages it with such members rather than pulling it away from them, as would be the case if the belt were on the inside of the curve. It will also be observed that, since the belt traverses a curve of somewhat greater radius than that of the active tracks, it will be stretched somewhat in the process. However, since the belt is elastic, it readily accommodates itself to such curves. The elements marked 29 are simply diagrammatic showings of track supports on a base 30.

Fig. 10 diagrammatically illustrates an installation in which a single, continuous conveyor of the kind described provides three pairs of passenger conveying runs, all departing from and returning to a central station 35. At their outer ends, these three pairs of runs incorporate roll over turns 36, 37, 38 of the kind above described. At the central station various arrangements will be seen to be feasible. As illustrated, it may be assumed that there are entry and discharge points 39, 40, 41, 42, 43, 44 all located within or adjacent a central station, building or enclosure which it is desired to keep clear. In such a situation it will be seen that the runs of the conveyor within the building (marked 45, 46, 47) may all be underground or at a lower level, each being depressed to an extent such as to avoid interference with the others. Although depressed or underground in this instance, the runs 45 and 47 indicate the horizontal type of turn referred to above and one of which, if desired, can clearly be a passenger conveying turn at grade.

The conveyor can be driven at one or more points, three such (marked 50, 51 and 52) being indicated in Fig. 10. Each of the drives may be of the type shown in Figs. 11 and 12. In that drive, a motor 53, through reduction gearing 54, drives a sprocket 55 and chain 56. At intervals throughout its length the chain carries dogs 57 designed to enter the spaces between rods 58 (see Fig. 2) carried by and extending between the bars 4 on the undersides of the platform members.

While the belt is shown and described as being attached to each of the platform members, it will be recognized that the character of the turns and grades incorporated in any particular installation will determine whether that is essential or whether the belt may be attached to every other member, for example.

In the light of the foregoing description of the preferred form of the invention, the following is claimed:

1. A passenger conveyor comprising an endless series of adjacent platform members, a pair of horizontal axis wheels mounted on a common axis adjacent the trailing end only of each platform member, a centrally located, rigid draw bar projecting from beneath the leading end of each platform member and beneath the trailing end of the adjacent member, a universal joint coupling each of said draw bars with the trailing end of the adjacent platform member on the said common axis of its wheels, the platform members having only limited space between them sufficient to permit relative turning movement in a horizontal plane and also relative movement in an undulating path, a vertical axis wheel mounted on the underside of each platform member midway between its wheels and with its axis intersecting said common axis, tracks for said horizontal axis wheels and for said vertical axis wheels, means for driving the coupled platform members, and an endless elastic belt covering the entire series of platform members and the spaces between them, said belt being secured to the platform members at points intermediate the ends of the members and of a relaxed length less than that of the series of coupled platform members and said platform members having flat, upper surfaces adapted to serve as a passenger load support throughout the belt area excepting only for the limited turning space between the members.

2. A passenger conveyor comprising an endless series of adjacent platform members, a pair of horizontal axis wheels mounted on a common axis adjacent the trailing end only of each platform member, a centrally located, rigid draw bar projecting from beneath the leading end of each platform member and beneath the trailing end of the adjacent member, a universal joint coupling each of said draw bars with the trailing end of the adjacent platform member, the platform members having only limited space between them sufficient to permit relative turning movement in a horizontal plane and also relative movement in an undulating path, a vertical axis wheel mounted on the underside of each platform member, tracks for said horizontal axis wheels and for said vertical axis wheels, means for driving the coupled platform members, and an endless elastic belt covering the entire series of platform members and the spaces between them, said belt being secured to the platform members at points intermediate the ends of the members and of a relaxed length less than that of the series of coupled platform members and said platform members having flat, upper surfaces adapted to serve as a passenger load support throughout the belt area excepting only for the limited turning space between the members.

3. A passenger conveyor comprising an endless series of adjacent platform members, horizontal axis wheels for each platform member, a draw bar projecting from beneath the leading end of each platform member and beneath the trailing end of the adjacent member, a universal joint coupling each of said draw bars with the trailing end of the adjacent platform member, the platform members having only limited space between them sufficient to permit relative turning movement in a horizontal plane and also relative movement in an undulating path, a vertical axis wheel mounted on the underside of each platform member, tracks for said horizontal axis wheels and for said vertical axis wheels, means for driving the coupled platform members, and an endless elastic belt covering the entire series of platform members and the spaces between them, said belt being secured to the platform members at points intermediate the ends of the members and of a relaxed length less than that of the series of coupled platform members and said platform members having flat, upper surfaces adapted to serve as a passenger load support throughout the belt area excepting only for the limited turning space between the members.

4. A passenger conveyor comprising an endless series of adjacent platform members, horizontal axis wheels for each platform member, universal joint connections coupling each of said platform members with the adjacent platform members, the latter members having only limited space between them sufficient to permit relative movement between the members, a vertical axis wheel mounted on the underside of each platform member, tracks for said horizontal axis wheels and for said vertical axis wheels, means for driving the coupled platform members, and an endless elastic belt covering the entire series of platform members and the spaces between them, said belt being secured to the platform members at points intermediate the ends of the members and of a relaxed length less than that of the series of coupled platform members and said platform members having flat, upper surfaces adapted to serve as a passenger load support throughout the belt area excepting only for the limited turning space between the members.

5. A passenger conveyor comprising an endless series of closely spaced platform members, universal couplings between each platform member and adjacent members, each said member having horizontal axis wheels, tracks for said wheels, an elastic belt mounted on and secured to said members, the latter forming a flat, substantially uninterrupted support for the belt, said tracks including a semi-circular reverse curve section, the tracks preceding such section being arranged to follow a helical path to dispose one such track at a higher level than the other, with the belt on the outside of the curve, each platform member also having vertical axis wheel means and a track therefor located to afford support to the conveyor in the roll over turn section.

6. A passenger conveyor comprising an endless series of closely-coupled platform members having wheels, tracks for said wheels, an elastic belt mounted on and secured to said members, the latter forming a flat, substantially uninterrupted support for the belt, said tracks including a semi-circular reverse curve section, the tracks preceding such section being arranged to follow a helical path to dispose one of the tracks at a higher level than the other, the belt in such section being disposed on the outside of the curve.

7. A passenger conveyor comprising an endless series of closely-coupled platform members having wheels, tracks for said wheels, a pretensioned, elastic belt mounted on and secured to said members with its marginal portions free to stretch and contract independently thereof, said members forming a flat, substantially uninterrupted support for the belt, said tracks including a semi-circular reverse curve section, the tracks preceding such section being arranged to follow a helical path to dispose one of the tracks at a higher level than the other, the belt in such section being disposed on the outside of the curve.

8. A passenger conveyor comprising an endless track, an endless train of closely-coupled, wheeled platform members on the track, said members having flat, upper surfaces for supporting the passenger load, and an endless, pretensioned, elastic belt superimposed on the train of platform members and secured to them, the said track including a flat turn of a radius such that the inner edge of the belt is subjected to a tension less than said pretension but greater than zero.

9. A passenger conveyor comprising the combination of an endless coupled train of flat-topped, wheeled platform members, an endless, elastic belt of a relaxed length less than that of the train of platform members, said belt disposed on the platform members to provide a flat, passenger support-surface and stretched to a length to equal that of the said train, means securing the belt to the platform members and thereby holding it against lengthwise contraction and track means defining an endless circuit, said track means supporting and holding the platform members against departure from the circuit under the influence of the belt tension.

10. A passenger conveyor including: a passenger support surface comprising an endless elastic belt, an endless coupled train of wheeled, flat topped platform members supporting the belt and means securing the belt to said members under tension throughout its length, with its marginal portions free to stretch and contract independently of said members, whereby in response to predetermined relative turning movement of the platform members in a horizontal plane, the tensioned inner marginal portions of the belt are free to contract without buckling.

References Cited in the file of this patent

UNITED STATES PATENTS

| | | |
|---|---|---|
| 1,884,112 | Morgan | Oct. 25, 1932 |
| 2,150,610 | Raffetto | Mar. 14, 1939 |
| 2,582,881 | Mitchell | Jan. 15, 1952 |
| 2,594,342 | Pettyjohn | Apr. 29, 1952 |
| 2,678,717 | Lucas | May 18, 1954 |

FOREIGN PATENTS

| | | |
|---|---|---|
| 1,088,779 | France | Sept. 15, 1954 |
| 925,937 | Germany | Mar. 31, 1955 |